United States Patent
Wells et al.

(10) Patent No.: US 9,862,498 B2
(45) Date of Patent: Jan. 9, 2018

(54) LASER-CHARGED HIGH-SPEED PROPULSION SYSTEM AND METHOD FOR PRODUCTION OF HIGH-POWERED LASER

(71) Applicants: Byron Wells, Howell, MI (US); Matthias Ihme, Palo Alto, CA (US)

(72) Inventors: Byron Wells, Howell, MI (US); Matthias Ihme, Palo Alto, CA (US)

( * ) Notice: Subject to any disclaimer, the term of this patent is extended or adjusted under 35 U.S.C. 154(b) by 855 days.

(21) Appl. No.: 14/326,043

(22) Filed: Jul. 8, 2014

(65) Prior Publication Data
US 2015/0330307 A1 Nov. 19, 2015

Related U.S. Application Data

(60) Provisional application No. 61/857,725, filed on Jul. 24, 2013.

(51) Int. Cl.
| | | |
|---|---|---|
| *B64D 33/02* | (2006.01) | |
| *F02C 7/264* | (2006.01) | |
| *B64C 30/00* | (2006.01) | |
| *F02C 3/04* | (2006.01) | |
| *F02K 7/14* | (2006.01) | |
| *F02C 3/14* | (2006.01) | |
| *F23R 3/00* | (2006.01) | |
| *B64D 33/04* | (2006.01) | |

(52) U.S. Cl.
CPC .............. *B64D 33/02* (2013.01); *B64D 33/04* (2013.01); *F02C 3/04* (2013.01); *F02C 3/14* (2013.01); *F02C 7/264* (2013.01); *F02K 7/14* (2013.01); *F23R 3/00* (2013.01); *B64C 30/00* (2013.01); *B64D 2033/026* (2013.01); *F05D 2220/10* (2013.01); *F23R 2900/00006* (2013.01)

(58) Field of Classification Search
CPC ......... F23R 2900/00006; H01S 3/0937; H01S 3/0953; H01S 2220/80; H01S 7/14; F02K 7/14; F05D 2220/80; F02C 7/264; F05B 2220/10; B64D 33/02; B64D 33/04; B64D 2033/026; B64C 30/00
See application file for complete search history.

(56) References Cited

U.S. PATENT DOCUMENTS

| | | | | |
|---|---|---|---|---|
| 4,013,976 A * | 3/1977 | Hill | ............ | H01S 3/0953 359/342 |
| 6,853,798 B1 * | 2/2005 | Weiss | ............ | G01K 11/32 374/E11.015 |
| 2012/0107750 A1 * | 5/2012 | Krull | ............ | F23Q 13/005 431/2 |
| 2014/0208767 A1 * | 7/2014 | Suzuki | ............ | F02K 7/14 60/780 |
| 2014/0238038 A1 * | 8/2014 | Macchia | ............ | F02C 7/264 60/778 |

* cited by examiner

*Primary Examiner* — William H Rodriguez
*Assistant Examiner* — William Breazeal
(74) *Attorney, Agent, or Firm* — Vincent N. Mastrogiacomo

(57) ABSTRACT

A high-speed propulsion system for a high-speed vehicle includes an air intake duct, a compression section, a combustion section, and an expansion section. A gas dynamic laser generator is disposed proximate the expansion section and generates a source of laser light. A laser transmission mechanism receives the laser light and transmits the laser light from the gas dynamic laser generator to the combustion section and to presents the laser light into the air/fuel mixture of the flowpath which promotes mixing, combustion, and flame stability.

13 Claims, 6 Drawing Sheets

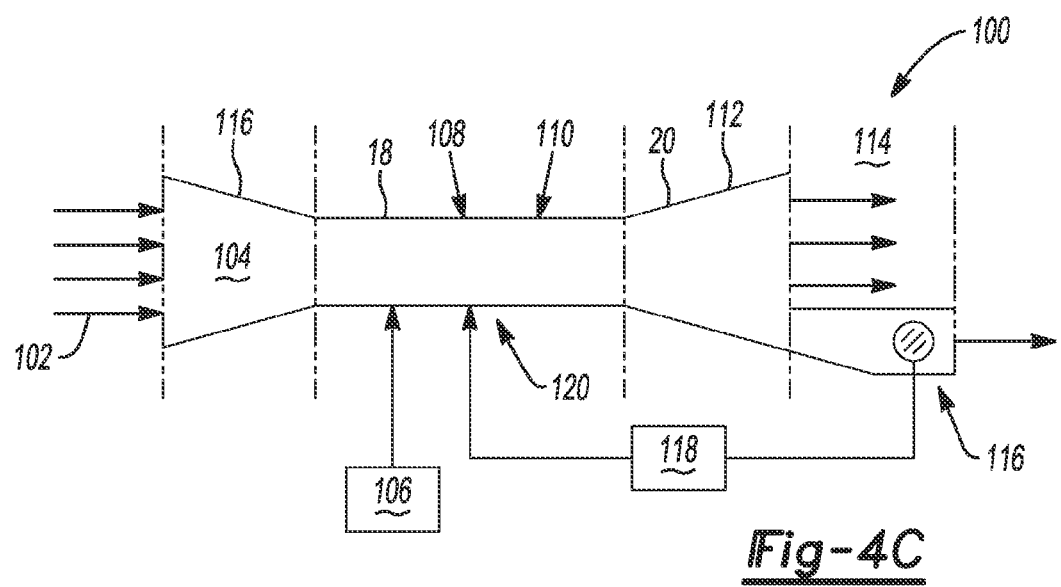
_Fig-4C_
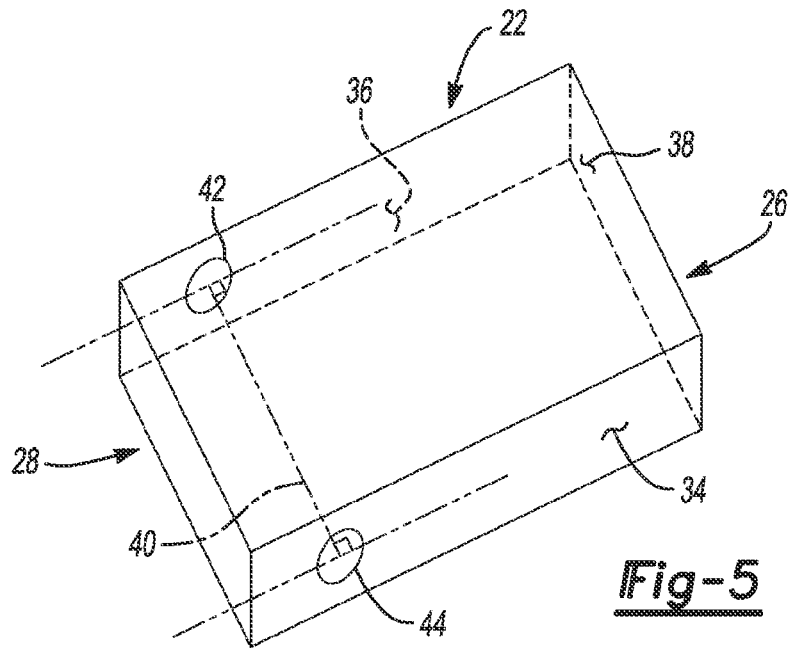
_Fig-5_

LASER-CHARGED HIGH-SPEED PROPULSION SYSTEM AND METHOD FOR PRODUCTION OF HIGH-POWERED LASER

CROSS-REFERENCE TO RELATED APPLICATIONS

This application claims the benefit of U.S. Provisional Application No. 61/857,725 filed on Jul. 24, 2013. The disclosure of the above application is incorporated herein by reference.

FIELD

The invention relates generally to a high-speed propulsion system and more particularly to a high-speed propulsion system using improved techniques and design for enhancing and maintaining fuel combustion.

BACKGROUND

The statements in this section merely provide background information related to the present disclosure and may or may not constitute prior art.

Four methods of mixing enhancement have been developed and are: passive and active control of compressible, three dimensional jets, generation of axial vorticity in planar and axi-symmetric shear layers, and shock interactions with planar and axi-symmetric shear layers. The drawback to these methods is that all of them involve flow interactions with structures in the combustion chamber (ducts, cavities, and ramps typically) and these introduce significant pressure losses to the extent of essentially eliminating these mixing schemes.

While current scramjet or high-speed propulsion systems achieve their intended purpose, the need for new and improved air/fuel mixing and combustion and flame stabilization, is essentially constant. Accordingly, there is a need for an improved and reliable high-speed propulsion systems.

SUMMARY

A high-speed propulsion system is provided having an air intake duct, a compression section, a combustion section, an expansion section, an exhaust duct, a gas dynamic laser generator, a laser transmission mechanism, and a fuel system. The air intake receives incoming air. The compression section is disposed adjacent to and downstream from the air intake duct. The combustion section is disposed adjacent to and downstream from the compression section. The expansion section is disposed adjacent to and downstream from the combustion section. The exhaust duct is disposed adjacent to a downstream end of the expansion section. The exhaust duct combines with the expansion section, combustion section, compression section, and air intake duct to form an air flowpath. The gas dynamic laser generator is disposed proximate the expansion section. The gas dynamic laser generator has an intake section configured to receive expansion gas from a feed gas path and configured to generate a source of laser light. The laser transmission mechanism is configured to receive laser light from the source of laser light, transmit the laser light from the gas dynamic laser generator to the combustion section, and to present the laser light into the air flowpath. The fuel system has a fuel injection manifold disposed in the compression section.

In another example of the present invention, the feed gas path is one of a first, a second, and a third feed gas path. The first feed gas path receives expansion gas from a front area of the expansion section. The second feed gas path receives expansion gas from a midpoint area of the expansion section. The third feed gas path receives expansion gas from the exhaust duct.

In yet another example of the present invention, the fuel is a hydrocarbon based fuel and the gas dynamic laser generator is a carbon dioxide based gas dynamic laser generator.

In yet another example of the present invention, the laser transmission mechanism includes a plurality of individual transmitting channels that are divisible to project a specified pattern of laser light into the air flowpath.

In yet another example of the present invention, the laser transmission mechanism includes a fiber optic cable having multiple fibers with varying cross-sections of round, oval or oblong shapes.

In yet another example of the present invention, the specified pattern of laser light is adjustable to target specified areas of the air flowpath.

In yet another example of the present invention, the speed of an airflow through and relative to the air flowpath is supersonic.

In yet another example of the present invention, the high speed propulsion system further includes an adjustable feed gas system having a fresh air portion configured to add fresh air to the feed gas path.

In yet another example of the present invention, the high speed propulsion system further includes an adjustable feed gas system having an auxiliary combustion portion configured to add exhaust gas to the feed gas path.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 4C is a model of an exemplary high-speed propulsion system according to the present invention;

FIG. 5 is a cut-away perspective view of a gas dynamic laser generator of an exemplary high-speed propulsion system according to the present invention;

DETAILED DESCRIPTION

The following description is merely exemplary in nature and is not intended to limit the present disclosure, application, or uses.

Figure 1:
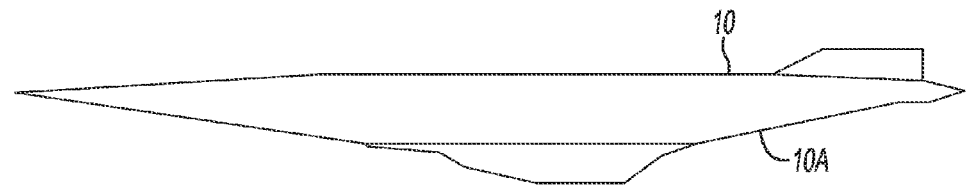
FIG. 1 is a lengthwise cross-section of an exemplary vehicle equipped with a high-speed propulsion system according to the present invention.
Figure 2:
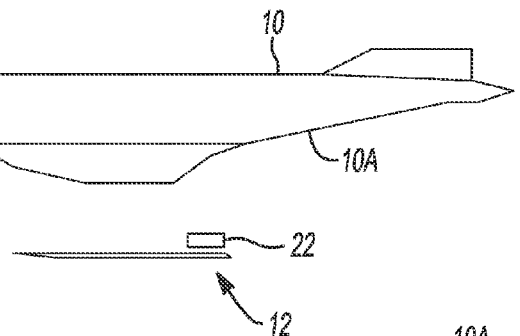
FIG. 2 is a lengthwise cross-section of an exemplary high-speed propulsion system according to the present invention.

With reference to FIGS. 1 and 2, an exemplary high-speed vehicle 10 having a corresponding high-speed propulsion system 12 is illustrated and will now be described. The high-speed propulsion system 12 is shown attached to a lower side 10A of the high-speed vehicle 10. The high-speed propulsion system 12 includes an air intake duct or section 14, a compression section 16, a combustion section 18, an expansion section 20, a gas dynamic laser generator 22, and an exhaust duct or section 24. More specifically, the air intake section 14 is the foremost section of the high-speed propulsion system 12. The air intake section 14 is followed by the compression section 16 which includes a convergent cross-sectional area from the air intake section to the beginning of the adjacent combustion section 18. The combustion section 18 ends with the beginning of the expansion section 20 which has a divergent cross section leading to the exhaust section 24. The gas dynamic laser generator 22 is disposed in the expansion section 20 and includes and intake section 26 and an exhaust section 28. In combination, the air intake section 14, the compression section 16, the combustion section 18, the expansion section 20, and the exhaust section 28 forms an air flowpath 29. The intake section 26 of the gas dynamic laser generator 22 faces the same direction D1 as the intake section 14 of the high-speed propulsion system 12 while the exhaust section 28 opens to the exhaust section 24 of the high-speed propulsion system 12. Additionally, while the high-speed propulsion system 12 is modeled after a scramjet engine, the high-speed propulsion system may be modeled after many other high-speed systems including ramjets, gas turbine engines, etc. without departing from the scope of the invention.

Figure 3:
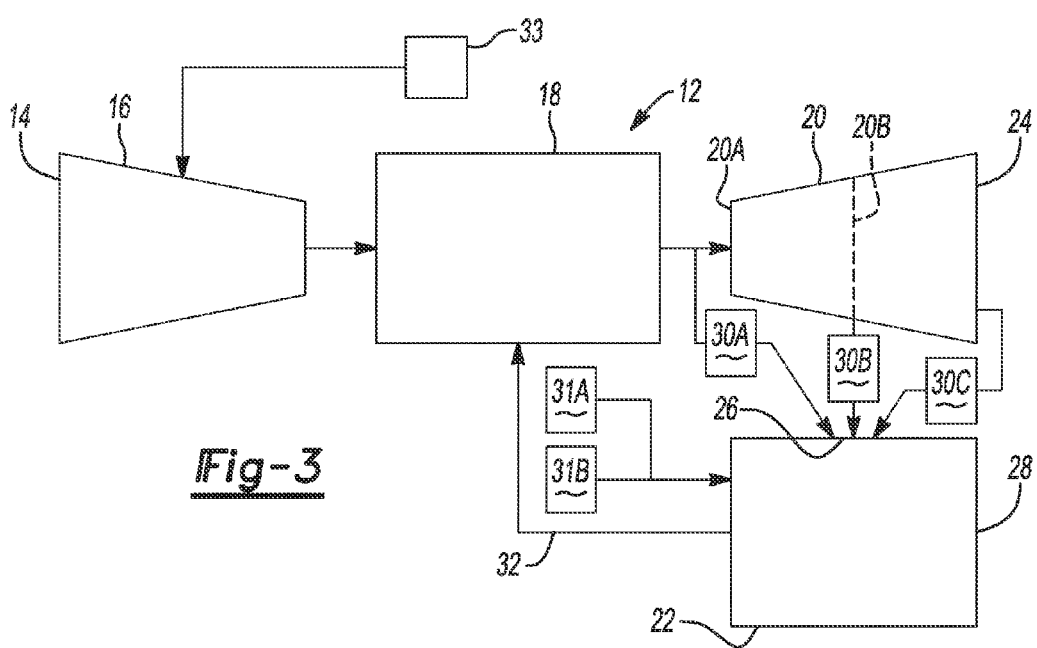
FIG. 3 is a diagrammatic illustration of an exemplary high-speed propulsion system according to the present invention.

Referring now to FIG. 3, a diagram of the process of the high-speed propulsion system is illustrated and will now be described. In FIG. 3, components or elements will have the same reference numbers as the like components of FIGS. 1 and 2. As stated above, the high-speed propulsion system 12 includes an air intake section 14, a compression section 16, a combustion section 18, an expansion section 20, a gas dynamic laser generator 22, and an exhaust duct or section 24. The high-speed propulsion system 12 also includes a plurality of feed gas paths 30A, 30B, 30C, a laser feedback mechanism or path 32, and a fuel injection system 33. For example, a first feed gas path 30A provides expansion gases from a front area 20A of the expansion section 20 to the intake section 26 of the gas dynamic laser generator 22. A second feed gas path 30B provides expansion gases from a midpoint area 20B of the expansion section 20 to the intake section 26 of the gas dynamic laser generator 22. A third feed gas path 30C provides expansion gases from the exhaust section 24 to the intake section 26 of the gas dynamic laser generator 22. The laser feedback mechanism 32 is configured to receive laser light generated by the gas dynamic laser generator 22 and transmit the laser light into the combustion section 18 of the high-speed propulsion system 12. The fuel injection system 33 provides fuel to the airflow of the combustion section 18 prior to where the laser feedback mechanism 32 transmits the laser light into the combustion section 18. Furthermore, another embodiment of the high-speed propulsion system 12 includes an adjustable feed gas system 31 having a fresh air portion 31A and an auxiliary combustion portion 31B. The fresh air portion 31A is capable of diverting fresh or bleed air into the feed gas to lower the $CO_2$ content. The auxiliary combustion portion 31B is a separate combustion process that produces $CO_2$ that is added to the feed gas.

Figure 4A:
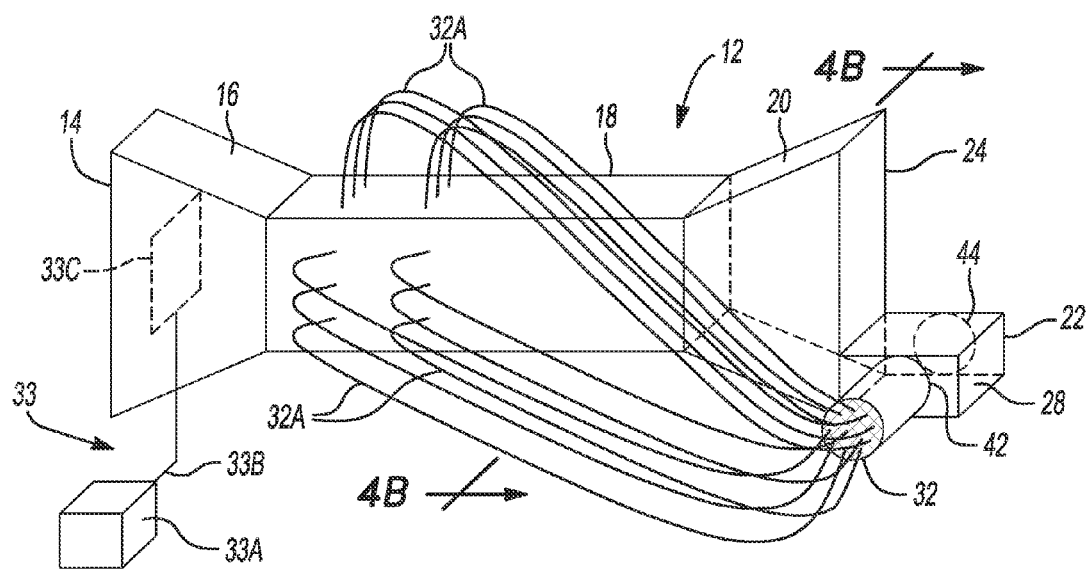
FIG. 4A is a perspective view of a model of an exemplary high-speed propulsion system according to the present invention.
Figure 4B:
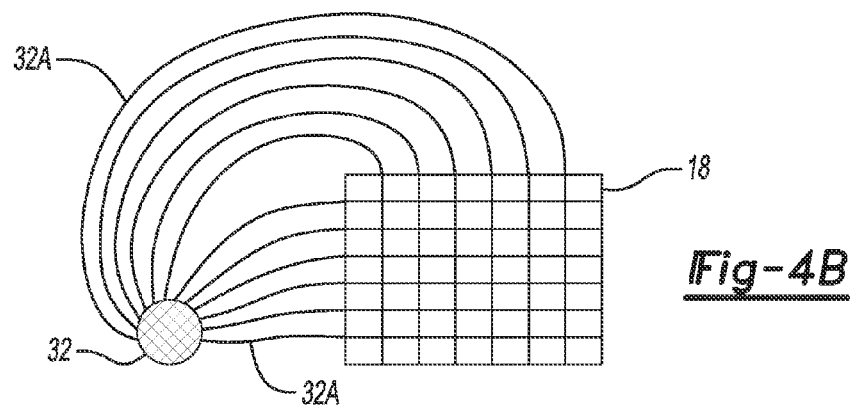
FIG. 4B is a cross section of a model of an exemplary high-speed propulsion system according to the present invention.

Referring now to FIGS. 4A and 4B, a high-speed propulsion system 12 is illustrated and will now described. The high-speed propulsion system 12 includes an air intake section 14, a compression section 16, a combustion section 18, an expansion section 20, a gas dynamic laser generator 22, a laser feedback mechanism or path 32, a fuel injection system 33, and an exhaust duct or section 24. As stated above, the laser feedback mechanism 32 is configured to receive laser light generated by the gas dynamic laser generator 22 and transmit the laser light into the combustion section 18 of the high-speed propulsion system 12. The laser feedback mechanism 32 may include a plurality of individual laser transmitting channels 32A that are separable and individually capable of configuring with the compression section 18 of the high-speed propulsion system 12 to provide a grid-like effect of laser light across the cross-section of the combustion section 18 (shown in FIG. 4B). Alternatively, the laser transmitting channels 32A may be configured to provide a single focused laser or to target specific areas of the combustion section 18 that may be prone to slow ignition. The fuel injection system 33 includes a fuel pump 33A, fuel lines 33B, and a fuel injection manifold 33C. The fuel pump 33A is disposed elsewhere in the vehicle 10 and pumps fuel from a fuel tank (not shown) to pressurize the fuel in the fuel lines 33B. The fuel lines 33B transfer pressurized fuel from the fuel pump 33A to the fuel injection manifold 33C. The fuel injection manifold 33C is disposed in the combustion section 18 of the high-speed propulsion system 12 and disperses fuel into the compressed air flow.

Referring now to FIG. 4C, an example of an operational cycle and method 100 of a high-speed propulsion system 12 is illustrated and will now be described. The operational cycle 100 begins with an incoming air flow 102 typically having a supersonic speed relative to the vehicle. In a first step 104 of the cycle 100 the air flow 102 is compressed by way of the shape of the underbody of the vehicle and the compression section 16 of the high-speed propulsion system 12. A second step 106 of the cycle includes injecting fuel into the combustion section 18. A third step 108 includes mixing the air flow and injected fuel forming a compressed air/fuel mixture. A fourth step 110 includes ignition of the compressed air/fuel mixture. A fifth step 112 includes burning of the compressed air/fuel mixture, expansion of the resulting hot gases, and directing the expanding hot gases out the expansion section producing thrust. A sixth step 116 includes directing some of the expanding hot gas into the gas dynamic laser generator 22 thus producing a laser light source; the specifics of which will be explained further below. A seventh step 118 transmits the laser-light from the gas dynamic laser generator 22 to the combustion section 18. An eighth step 120 disperses the laser light into the combustion section 18 promoting additional mixing and more complete and prolonged ignition of the compressed air/fuel mixture.

Figure 7:
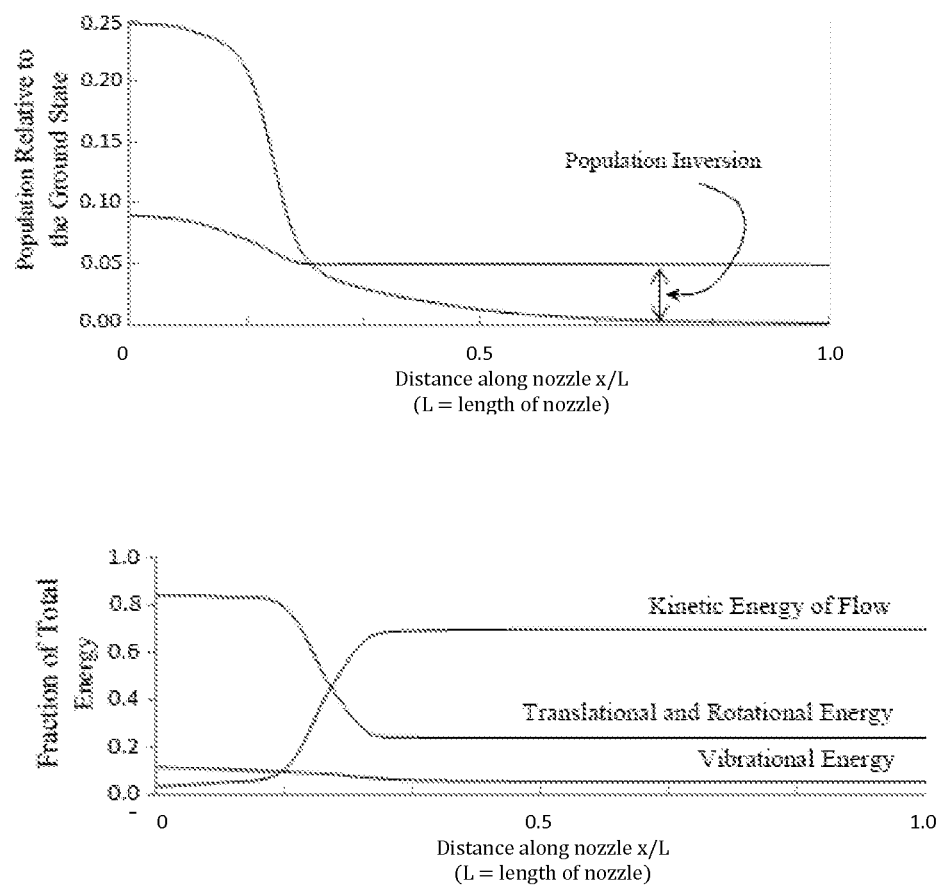
FIG. 7 is a schematic diagram showing the energy partition of the flow of $CO_2$ gas as a function of axial distance along a nozzle according to the present invention.

Referring now to FIG. 7, a schematic diagram showing the energy partition of the flow of $CO_2$ gas as a function of axial distance along a nozzle is illustrated and will now be explained. The gas dynamic laser generator 22 utilizes concepts of generating a laser light from a $CO_2$ gas dynamic laser generator while adapting the laser generator 22 for use in a high-speed population system 12. The gas dynamic laser generator utilizes the cooling of gas expansion from high to low pressure. By 'cooling' in this context it is meant that there is a decrease in the translational temperature of the gas. The expansion of a hot gas through supersonic nozzle transforms the random kinetic motion of the gas molecules into directed motion in the axial direction of the nozzle. Since energy must be conserved, the random component of molecular velocity must decrease and the gas cools translationally. In general, the rotational energy of the molecules is coupled to the translational mode so the rotational temperature also falls. The vibrational energy of the gas, on the other hand, is largely uncoupled form the translational and rotational modes and therefore does not equilibrate as quickly as the translational and rotational temperature. Therefore, population of the excited vibrational energy levels stay elevated much longer than the translation and rotation excited levels. Further, a population inversion can occur if the higher vibrational energy levels stay populated much longer than the lower vibrational levels. The key is to generate and maintain the population inversion in a stable and efficient manner. Graph 1 depicts the general idea behind the population inversion where the partition of energy is shown as a function of axial distance along a nozzle.

Figure 8:
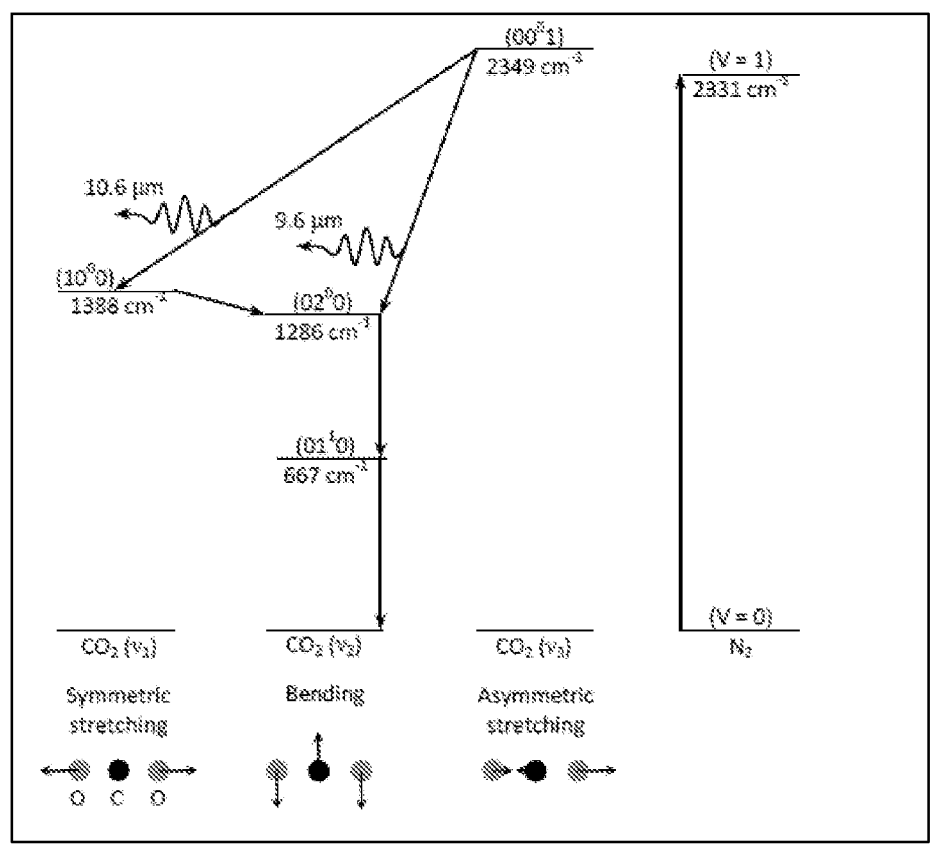
FIG. 8 is a vibrational energy level diagram for CO2 and N2 according to the present invention.

Referring now to FIG. 8 a vibrational energy level diagram for CO2 and N2, showing only those levels most important to the CO2 laser is shown and will now be explained (note that the CO2 bending mode is doubly degenerate). In a $CO_2$ gas dynamic laser, the expansion of $CO_2$ gas alone cannot generate a long enough population inversion to be of any practical use. The presence of $N_2$ and $H_2O$ vastly increases the effectiveness in generating and maintaining a population inversion long enough to generate a useful laser medium. The presence of $N_2$ acts to keep the higher vibration level of $CO_2$ populated while the $H_2O$ acts to depopulate the lower laser level. Thus, the addition of these molecule combined effect is the attainment of a population inversion between the upper and lower vibrational levels of the $CO_2$ gas. This process is depicted in Graph 2. It can be seen in the diagram that the energy levels of v=1 for $N_2$ and the 00°1 level of the $CO_2$ ($\Delta E$=18 $cm^{-1}$). This closeness in energy levels allows for the resonant energy transfers between the two molecules. This combined with the fact that in the exhaust gases of hydrocarbon/air propulsion the number of $N_2$ molecules is much larger than the number of $CO_2$ molecules. It is also important to note that the life time of the v=1 excited state of $N_2$ is significantly longer than $CO_2$'s 00°1 state. This allows for the population inversion to exist longer such that more energy can be extracted. While $N_2$ is important for artificially lengthening the lifetime of the population of the upper vibrational energy level of the $CO_2$ (the 00°1 level shown in Graph 2) $H_2O$ plays an equally important role in artificially shortening the life time of the lower $CO_2$ vibration level (the 10°0 level) by depopulating it through collisions. Further, since the reaction products of hydrocarbon and air are largely $N_2$, $CO_2$, and $H_2O$, the gases that feed the gas dynamic laser 22 are made readily available by the hydrocarbon-fueled high-speed propulsion system. Alternatively, other types of fuel can be used to fuel the high-speed propulsion system such as hydrogen. However, using an alternative fuel also produces alternative constituent exhaust gas which is accounted for when diverting the exhaust gas as feed gas for the gas dynamic laser 22. Furthermore, it is noted that the resultant drop in thrust in diverting feed gas to the gas dynamic laser 22 is minimal as only a small portion of the exhaust gas is needed in the gas dynamic laser 22 since the energy levels required for combustion enhancement and flame holding is much less than the total energy available in the high-speed propulsion system.

The following formula defines population inversion between a pair of levels (for example, between 00°1 and 10°0 in $CO_2$) is simply given as:

$$\eta = \frac{N_{00°1}}{N_{10°0}} = \frac{N_{tot} \frac{e^{-\theta_{v00°1}/T}}{Q_{vibCO_2}}}{N_{tot} \frac{e^{-\theta_{v10°0}/T}}{Q_{vibCO_2}}} = \frac{e^{-\theta_{v00°1}/T}}{e^{-\theta_{v10°0}/T}}$$

Here, N is the population of the level and $Q_{vibCO2}$ is the vibrational partition function of the $CO_2$ molecule. If $\eta > 1$ then the gas acts as a laser medium and radiation at the transition energy is amplified. Otherwise, for $\eta < 1$ only absorption occurs and there is no laser. Since the 10°0 level equilibrates so quickly compared to the 00°1 level it can be assumed that the lower level vibrational temperate equals the equilibrium temperature of the flow after expansion ($T_f$) and that the upper level, because of its longer decay, remains at the temperature of the gas in the combustion chamber prior to expansion ($T_{cc}$) so that the population inversion is now as follows:

$$\eta = \frac{e^{-\theta_{v00°1}/T_{cc}}}{e^{-\theta_{v10°0}/T_f}}$$

Using the above equation the minimum required temperature drop to create a population inversion can be estimated by setting $\eta$=1 to get:

$$\left(\frac{T_{cc}}{T_f}\right)_{min} = \frac{\theta_{v00°1}}{\theta_{v10°0}} = 1.7$$

So for $T_{cc}/T_f > 1.7$ a population inversion is generated. For a scramjet or a high-speed propulsion system 12, such as described here, $3 < T_{cc}/T_f < 10$ and therefore population inversion generation is expected in the exhaust flow. Furthermore, the composition of the feed gas is adjustable to achieve the population inversion. Fresh or bleed air dilution into the feed gas to lower the $CO_2$ content or $CO_2$ can be added to the feed gas through a complementary or auxiliary combustion process.

Once the population inversion is favorable to generate laser energy, optimization or maximization of the laser energy is achievable in each of at least two ways. The first is to optimize the laser energy as a function of feed gas composition and the second to maximize laser energy as a function of gas dynamic laser nozzle geometry.

As with all processes involving the combination of air, hydrocarbon fuel, and ignition, improvements in mixing of the air and fuel and consistency of ignition are key to advancing the efficiency and robustness of the process.

Chemical reactions cannot occur unless there are a sufficient number of molecular collisions between the reactants such that atoms can be exchanged. This requires the reactants to be well mixed on the molecular level (micromixing) before combustion can commence. Chemical reaction rates can be accelerated by vibrationally or electronically exciting the reactants prior to combustion. Reactants excited to just the first vibrational or electronic state react one to two orders of magnitude faster than unexcited reactants. The utility of this acceleration is advantageous for a high-speed propulsion system 22 where residence times of the reactants can be sub-millisecond. This is especially important for hydrocarbon fuels which react much slower than hydrogen.

The present invention contemplates using laser energy to provide excitation to the reactants and to create a laser generated plazma. Laser energy enhances mixing by providing precise pinpoint energy deposition to the flow while at the same time providing ignition at strategic locations in the flow to target a micromixed region that is unreachable by conventional ignition systems. Lasers have the additional advantages of significantly reducing ignition delay and providing an efficient means of flame holding.

There are several mechanisms by which laser energy can be transferred into the flow; thermal initiation, nonresonant breakdown, resonant breakdown, and photochemical ignition. In thermal initiation a laser source is used to excite a vibrational or rotational mode of the gas molecules. Nonresonant breakdown utilizes the electric field strength of a focused laser beam to cause electrical breakdown of the gas. Resonant breakdown consists of a nonresonant multiphoton photodissociation of a molecule followed by a resonant photoionization of an atom created by the photodissociation. Photochemical ignition requires the absorption of a single photon (typically in the UV range) by a molecule causing dissociation. Nonresonant breakdown will provide the most effective method of laser induced ignition for this application since the wavelength of the $CO_2$ laser (10 μm) is not near the transition radiations of the air and fuel molecules which are typically in the UV range (160 nm) or infrared range of 3-4 μm. Nonresonant breakdown starts the multiphoton ionization of a few localized gas molecules subsequently releasing electrons that absorb more photons which increases their kinetic energy. These initial electrons then collide with other molecules ionizing them and leading to an electron avalanche and breakdown of the gas. An essential consideration here is the required energy to cause the gas to breakdown. Other ignition sources show that break down requires on the order of 5 mJ of energy whereas laser induced ignition requires on the roughly an order of magnitude more energy; on the order of 50 to 100 mJ. The main reason for this additional energy is due to absorption losses in the gases. This provides us the capability to size the gas dynamic laser to the energy requirements of the high-speed propulsion system.

For a flow rate of 100 kg/s this amounts to an available energy of 1 MJ/s or IMW of power. This is 10 orders of magnitude higher than the required energy of 100 mJ for ignition. Therefore for each focal point of laser energy to be applied to the combustion flow 10 mg (milligrams) of exhaust flow would be needed. These hypothetical numbers do not account for inevitable losses in generating the gas dynamic laser and transferring this laser energy back into the flow. However, it is clear that only a very small amount of the exhaust flow is needed to generate the required laser energy. Even using 1% of the flow in the arrangement shown in FIG. 4A would allow for 100,000 such laser fibers (this is assuming a loss factor of 10) to be applied to combustion flow. This is clearly more than would be required and the complexity of such an arrangement would prohibit the use of such a large number of fibers. Unmistakably, there is ample energy in the exhaust flow to generate a gas dynamic laser capable of significant combustion enhancement without introducing significant losses to the flow.

Referring now to FIG. 5, a gas dynamic laser generator 22 of the high-speed propulsion system 12 is illustrated and will now be described. The gas dynamic laser generator 22 is disposed in or adjacent to the expansion section 20 of the high-speed propulsion system 12. In addition to the intake and exhaust sections 26, 28, the gas dynamic laser generator 22 further includes a first and a second side wall 34, 36, a top and a bottom wall 38, 40, a partially reflective mirror 42, and a fully reflective mirror 44. For example, the intake and exhaust sections 26, 28 are framed by the side walls 34, 36 and the top and bottom walls 38, 40 creating a duct through which flows the expanding and exhaust gasses of the expansion section 20 of the high-speed propulsion system 12. The fully reflective mirror 44 is disposed in the first side wall 34 and the partially reflective mirror 42 is disposed in the second side wall 36 opposite and aligned with the fully reflective mirror 44. The mirrors 42, 44 are further aligned such that planes defined by the surface of the mirrors 42, 44 are parallel to each other and that any light reflected in a perpendicular direction from one of the mirrors 42, 44 will strike the opposite mirror 42, 44.

Figure 6A:
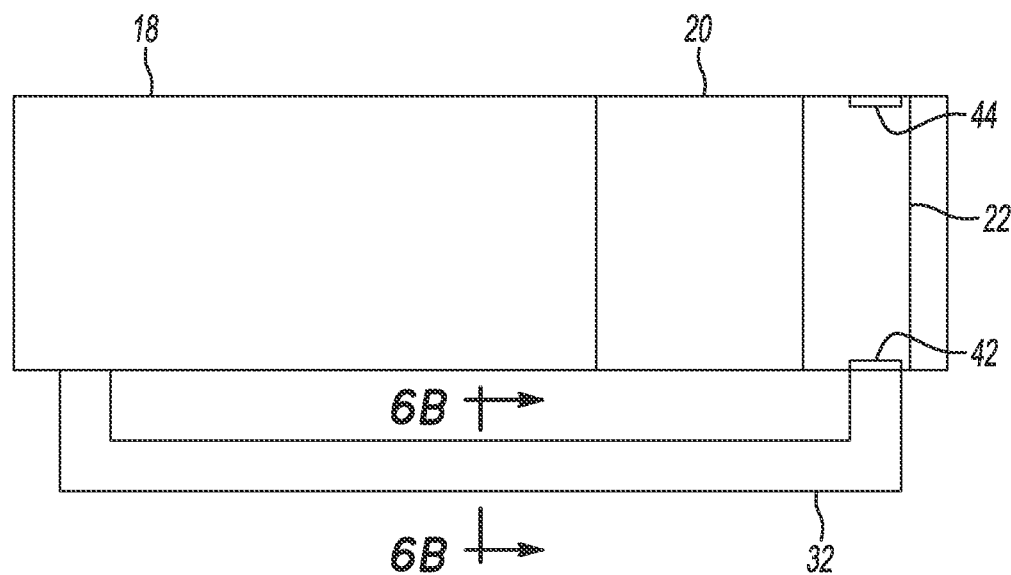
FIG. 6A is a plan view of a model of an exemplary high-speed propulsion system according to the present invention.
Figure 6B:
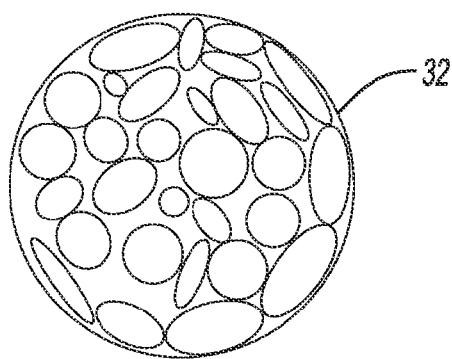
FIG. 6B is cross-section view of a fiber optic cable of an exemplary high-speed propulsion system according to the present invention.

Referring now to FIGS. 6A and 6B, a portion of the high-speed propulsion system 12 is illustrated and will now be described. The portion of the high-speed propulsion system 12 shown includes the combustion section 18, the expansion section 20, the gas dynamic laser generator 22 and the laser feedback mechanism 32. More specifically, the laser feedback mechanism 32 is attached to the gas dynamic laser generator 22 such that a portion of laser light that passes through the partially reflective mirror 42 of the gas dynamic laser generator 22 is collected by and transmitted through the laser feedback mechanism 32 and dispersed into the combustion section 18. For example, the dispersion of the laser light into the combustion section 18 may take the form of a multiple-plane grid as shown in FIGS. 4A and 4B or it may take another form without departing from the scope of the invention. Furthermore, the cross-section of FIG. 6B illustrates the shapes of the transmission mechanisms of the laser feedback mechanism 32. For example, the laser feedback mechanism 32 may be in the form of a fiber optic cable having multiple fibers with varying cross-sections of round, oval or oblong shapes.

The description of the invention is merely exemplary in nature and variations that do not depart from the gist of the invention are intended to be within the scope of the invention. Such variations are not to be regarded as a departure from the spirit and scope of the invention.

What is claimed is:

1. A supersonic propulsion system for a supersonic vehicle comprising:
   a gas dynamic laser generator having a gas intake;
   a fuel manifold that provides a fuel;
   an air intake duct for receiving air;
   a compression section that compresses the air and that receives the fuel to generate a compressed air/fuel mixture, wherein the compression section provides the compressed air/fuel mixture to a combustion section to produce combustion products, wherein the combustion section provides the combustion products to an expansion section that expands the combustion products to generate expanded combustion products, wherein a first portion of the expanded combustion products are exhausted from an exhaust duct to propel the supersonic vehicle and wherein a second portion of the expanded combustion products are provided to the gas dynamic laser via the gas intake to generate laser light, and wherein the exhaust duct combines with the expansion section, combustion section, compression section, and air intake duct to form an air flowpath; and at least one fiber optic, wherein the at least one fiber optic directs the laser light into the combustion section.

2. The supersonic propulsion system of claim 1, wherein the second portion of the expanded combustion products are provided by a feed gas path, wherein the feed gas path is one of a first feed gas path, a second feed gas path, and a third feed gas path, and wherein the first feed gas path receives the second portion of the expanded combustion products from a front area of the expansion section, the second feed gas path receives the second portion of the expanded combustion products from a midpoint area of the expansion section, and the third feed gas path receives the second portion of the expanded combustion products from the exhaust duct.

3. The supersonic propulsion system of claim 1, wherein the fuel is a hydrocarbon based fuel and the gas dynamic laser generator is a carbon dioxide based gas dynamic laser generator.

4. The supersonic propulsion system of claim 1, wherein the at least one fiber optic includes a plurality of individual transmitting channels that are divisible to project a pattern of laser light into the air flowpath.

5. The supersonic propulsion system of claim 1, wherein the at least one fiber optic includes a fiber optic cable having multiple fibers with varying cross-sections of round, oval or oblong shapes.

6. The supersonic propulsion system of claim 4, wherein the pattern of laser light is adjustable to target specified areas of the air flowpath.

7. The supersonic propulsion system of claim 1, wherein a speed of an airflow through and relative to the air flowpath is supersonic.

8. The supersonic propulsion system of claim 1 further including an adjustable feed gas system having a fresh air portion configured to add fresh air to the feed gas path.

9. The supersonic propulsion system of claim 1 further including an adjustable feed gas system having an auxiliary combustion portion configured to add exhaust gas to the feed gas path.

10. A method for operating a supersonic propulsion system according to claim 1, wherein the supersonic vehicle is a scramjet, the steps comprising: a first step of compressing the air in the compression section to generate compressed air; a second step of injecting fuel into the compressed air via the fuel manifold to generate the compressed air/fuel mixture; a third step of igniting the compressed air/fuel mixture with the laser light within the combustion section to generate the combustion products; a fourth step of directing the combustion products to the expansion section to generate expanded combustion products; a fifth step of directing a first portion of the expanded combustion products to the exhaust duct to generate thrust thereby propelling the scramjet; a sixth step of directing a second portion of the expanded combustion products to the gas dynamic laser via the gas intake to generate the laser light; a seventh step of transmitting the laser light to the combustion section via the at least one optical fiber; an eighth step of dispersing the laser light into the combustion section promoting additional mixing and more complete and prolonged ignition of the compressed air/fuel mixture.

11. The method of claim 10 further comprising directing either fresh air or additional exhaust gas into the expanded combustion products to aid in producing the laser light.

12. The method of claim 10 wherein the fuel is a hydrocarbon based fuel.

13. The supersonic propulsion system of claim 1, wherein the supersonic vehicle is a scramjet.

* * * * *